(12) United States Patent
Choi et al.

(10) Patent No.: US 7,032,184 B1
(45) Date of Patent: Apr. 18, 2006

(54) VIDEO DISPLAY APPARATUS HAVING HOTKEY FUNCTIONS AND A METHOD THEREFOR

(75) Inventors: Chun-Geun Choi, Suwon (KR); Hong-Jae Kim, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 740 days.

(21) Appl. No.: 09/531,005

(22) Filed: Mar. 20, 2000

(30) Foreign Application Priority Data

Jun. 15, 1999 (KR) ................................ 1999-22400

(51) Int. Cl.
*G06F 3/00* (2006.01)
*G09G 5/00* (2006.01)

(52) U.S. Cl. ........................ 715/827; 345/172
(58) Field of Classification Search ........ 345/716–720, 345/711, 783, 810, 834–838, 840, 847, 825–827, 345/805, 172; 348/14.05, 14.03; 715/827
See application file for complete search history.

(56) References Cited

U.S. PATENT DOCUMENTS

| | | | | |
|---|---|---|---|---|
| 5,973,682 A | * | 10/1999 | Saib et al. ................... | 345/700 |
| 6,151,059 A | * | 11/2000 | Schein et al. ................. | 725/37 |
| 6,154,203 A | * | 11/2000 | Yuen et al. ................. | 345/716 |
| 6,198,479 B1 | * | 3/2001 | Humpleman et al. ........ | 345/733 |
| 6,211,870 B1 | * | 4/2001 | Foster ......................... | 345/744 |
| 6,308,327 B1 | * | 10/2001 | Liu et al. ...................... | 725/37 |
| 6,331,867 B1 | * | 12/2001 | Eberhard et al. ........... | 345/864 |
| 6,342,903 B1 | * | 1/2002 | Fado et al. .................. | 345/716 |
| 6,351,270 B1 | * | 2/2002 | Nishikawa et al. .......... | 345/717 |
| 6,353,444 B1 | * | 3/2002 | Katta et al. .................. | 345/716 |
| 6,414,700 B1 | * | 7/2002 | Kurtenbach et al. ......... | 345/810 |

FOREIGN PATENT DOCUMENTS

| | | |
|---|---|---|
| KR | 1998-0066766 | 10/1998 |
| KR | 1999-000783 | 1/1999 |

OTHER PUBLICATIONS

*Office action* from the Korean Intellectual Property Office issued in Applicant's corresponding Korean Patent Application No. 1999-0022400 dated Dec. 2005.

* cited by examiner

*Primary Examiner*—Kristine Kincaid
(74) *Attorney, Agent, or Firm*—Robert E. Bushnell, Esq.

(57) ABSTRACT

A video display apparatus having user-selected hotkey functions and a method of using them is disclosed in which a function of the video display system can be changed by a user. Information on a menu item is selected by a user from an OSD menu which the video display apparatus has stored in a memory unit as hotkey button information. The information is read from the memory unit to be executed whenever the user selects a given hotkey button. The hotkey button information may be re-set according to the user's desires, so that the user controls the functions of the video display apparatus with more ease and convenience.

10 Claims, 5 Drawing Sheets

VIDEO DISPLAY APPARATUS HAVING HOTKEY FUNCTIONS AND A METHOD THEREFOR

CLAIM OF PRIORITY

This application makes reference to, incorporates the same herein, and claims all benefits accruing under 35 U.S.C. §119 from my application VIDEO DISPLAY APPARATUS HAVING A HOTKEY FUNCTION AND METHOD USING THE SAME filed with the Korean Industrial Property Office on 15 Jun. 1999 and there duly assigned Ser. No. 22400/1999.

BACKGROUND OF THE INVENTION

1. Field of the Invention

The present invention relates to a video display apparatus having a hotkey function and a method of operating the apparatus. More particularly, the invention concerns a video display apparatus having a hotkey function for menu-selection and manipulation of user-selected, frequently utilized video apparatus control functions. The invention also concerns a method of operating a video display apparatus by use of a hotkey button.

2. Description of the Prior Art

Video display apparatuses, such as a television receiver and, a monitor, have various functions to permit users to adjust them. Such TV functions include color adjustment (e.g., tint), a volume control for an audio signal, and audio signal mute. Monitors have functions such as screen size adjustment, screen position adjustment, screen contrast/brightness adjustments, and audio signal mute.

Most video display apparatuses have one or more buttons for users to control them. The buttons are used to output signals for executing these functions immediately or else to output signals for displaying on-screen display (OSD) menu screens. Each menu screen has one or more menu items such as "make screen larger or smaller", "move screen up or down", and "make sound louder or quieter".

As the number of video functions has multiplied, embodying the functions has created a need for additional buttons to implement the additional functions. Accordingly, using a function control method in a video display apparatus embodied in an OSD menu method has become relatively more advantageous than the previous button method. However, the resulting multiplication and greater complexity of menus and sub-menus may confuse users or irritate them. As functions multiply, the time period for selecting an OSD menu item is lengthened since tbe user must repeatedly press arrow buttons to select an OSD menu item. Multimedia developments create even greater complexities for users.

In a known TV menu system illustrated in FIGS. 1A–1B, when a user presses an OSD button equipped on a front panel of a video display apparatus an OSD menu screen 2 appears with a cursor placed on a predetermined menu item. For the user to select a menu item on the OSD menu screen, the user moves the cursor by using arrow buttons on the video display or by using an input device (remote control device). Thus, for the user to select "AUDIO MUTE" function in FIG. 1A, the user moves the cursor three times downwards from its initial position by using an arrow button. Then, an OSD menu screen 4 as shown in FIG. 1B is displayed, while audio sound is sent out through a speaker.

SUMMARY OF THE INVENTION

Accordingly, it is an object of the present invention to provide a video display apparatus having a hotkey function. The video display apparatus has hotkey buttons, capable of controlling the video display apparatus by a function set by a user. The user selects as a hotkey button an item frequently selected by that user from the menu items for controlling the functions of the video display apparatus.

The video display apparatus of the present invention comprises: a button unit including hotkey buttons for providing key signals corresponding to menu items of an OSD menu that the user selects; a memory unit having information on OSD menu items set for the hotkey buttons; an OSD unit for providing an OSD character display signal to a video processing unit in response to a control signal sent from an external device and for displaying OSD characters on the screen; and a control unit for reading information for an OSD menu item stored in the memory unit when a button is selected by the user.

The hotkey button setting method for a video display apparatus of the invention comprises the steps of (1) determining if a menu item from an OSD menu is selected by a user; (2) generating an OSD menu screen in case that the menu item is selected; (3) determining if the user set a hotkey button information on a menu item on the OSD menu screen; and (4) changing hotkey button information stored in a memory unit when a hotkey button is set on a menu item, and storing such hotkey button information in the memory unit if the user sets the hotkey button information on a given menu item.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

FIG. 1A is the screen as it first appears. FIG. 1B is the screen after AUDIO MUTE function is selected.

FIG. 5A is the screen as it first appears. FIG. 5B is the screen after AUDIO MUTE function is selected.

DETAILED DESCRIPTION OF THE PREFERRED EMBODIMENT

A preferred embodiment of the present invention will be described in detail with reference to the accompanying drawings.

Figure 1A:
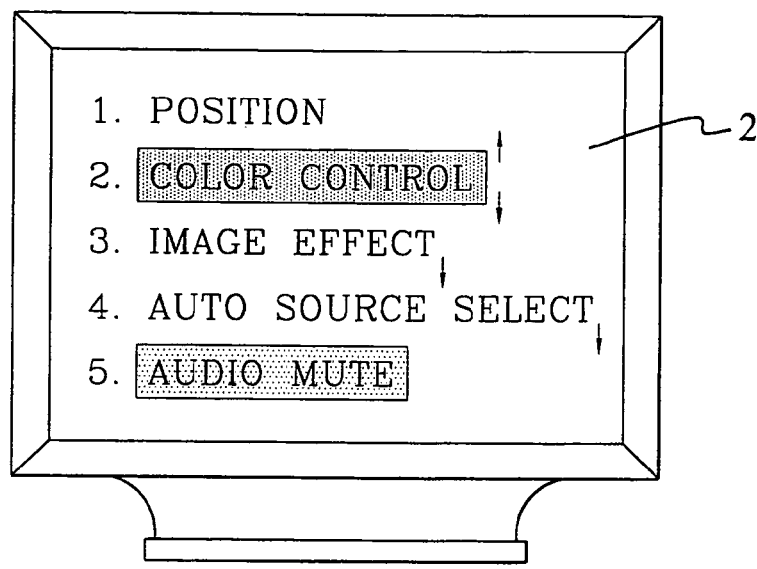
FIGS. 1A–1B depict a screen view showing a known OSD menu item selection and process.
Figure 1B:
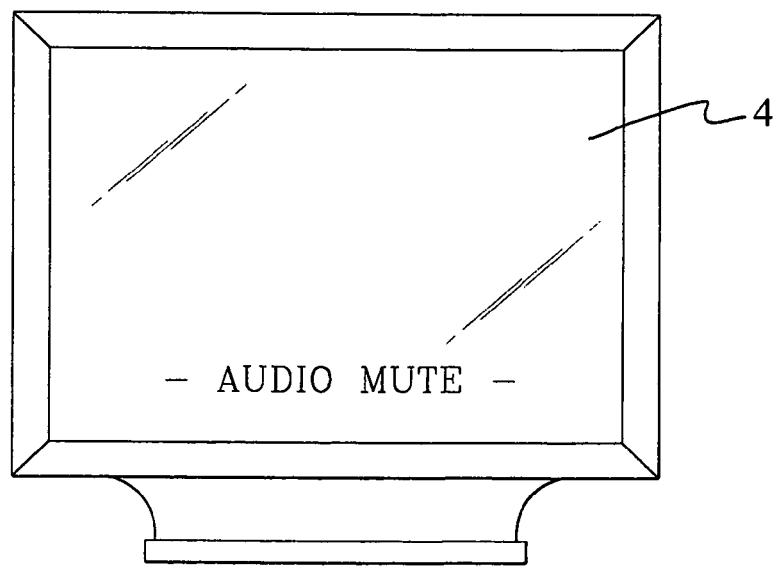
Figure 2:
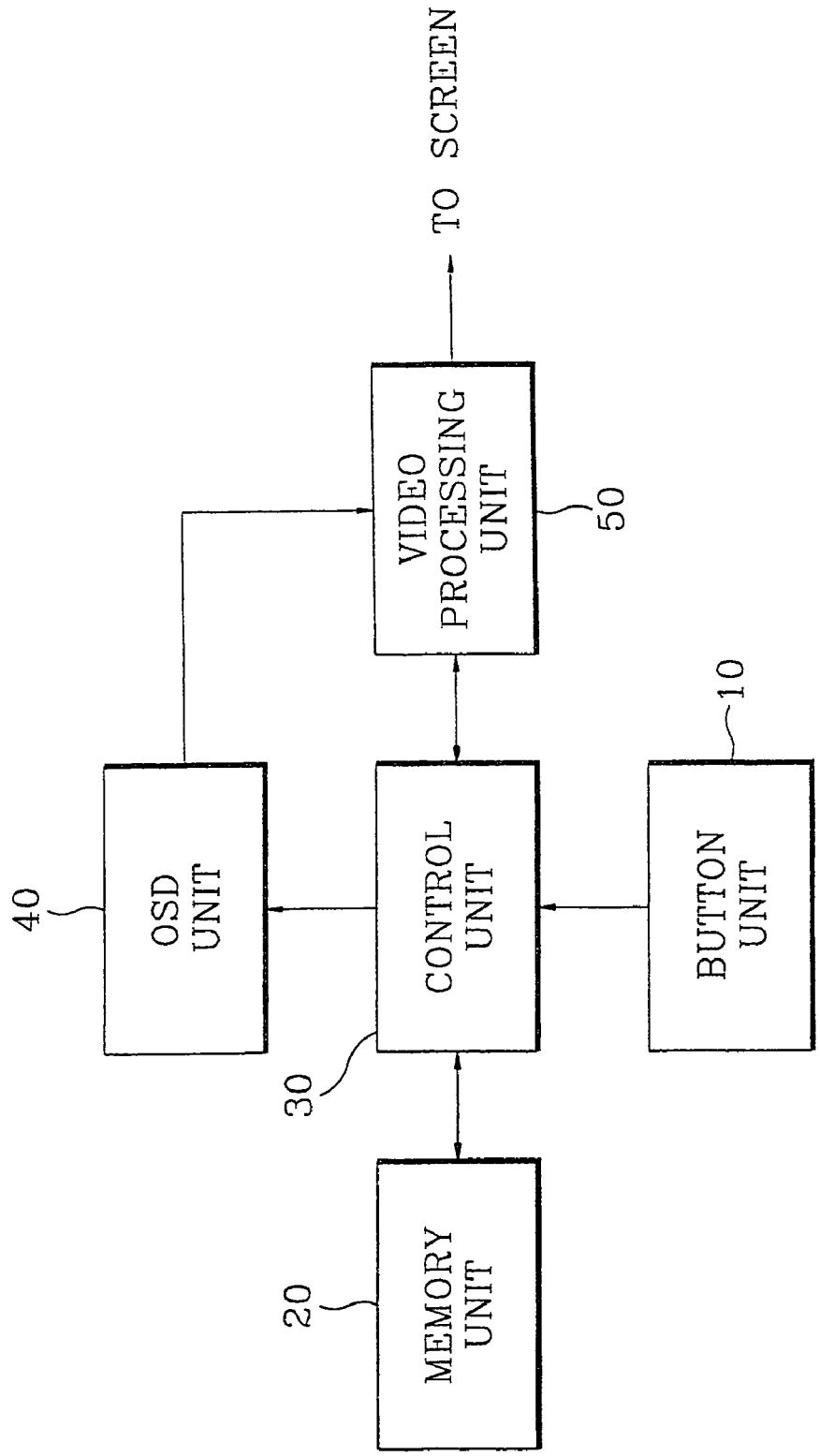
FIG. 2 schematically shows a structure of a video display apparatus having hotkey functions according to an embodiment of the present invention.

Referring to FIG. 2, which is a schematic showing a video display apparatus having hotkey functions according to an embodiment of the present invention, it is seen that a button unit 10 has buttons and is mounted on the body of a video display apparatus such as a television receiver. Button unit 10 may include several hotkey buttons each of which has information on one OSD menu item of OSD menu items selectable by a user.

A memory unit 20 stores information corresponding to each of the selectable OSD menu items and information on each of hotkey buttons. Memory unit 20 also stores information on hotkey buttons which is changeable by means of a control unit 30.

Control unit 30 sends an OSD character display signal to an OSD unit 40 when an OSD menu item is selected through the button unit 10. Further, control unit 30 can change hotkey button information stored in memory 20 and will then store the changed hotkey button information on a user-selected OSD menu item, which is selected by using button unit 10. Further, control unit 30 can control the entire system by reading hotkey button information stored in memory unit 20 when a hotkey button is selected through button unit 10. At this time, if there does not already exist any stored information on the selected hotkey button, control unit 30 controls the entire system by reading information from an OSD menu item set as a default.

Turning now to an embodiment of the present invention for use with a monitor, control unit 30 is adapted to input a color signal and a synchronization signal from a video card built into a computer and controls a video processing unit 50. In another embodiment of the invention for use with a television receiver, control unit 30 is adapted to input a broadcast signal received through an antenna to control video processing unit 50.

An OSD unit 40 outputs an OSD character signal according to an OSD character display signal from the control unit 30. Video processing unit 50 synthesizes a video signal and the OSD character signal from the OSD unit 40, according to a control signal from control unit 30, which causes display of characters on a screen.

A method for storing hotkey button information and selecting a hotkey button in a video display apparatus according to an embodiment of the present invention is now described with reference to the accompanying drawings.

Control unit 30 has two principal modes. One is a "setting mode" for setting a frequently used OSD menu, and the other is a "processing mode" for controlling the entire system based on user-selected hotkey button information.

Figure 3:
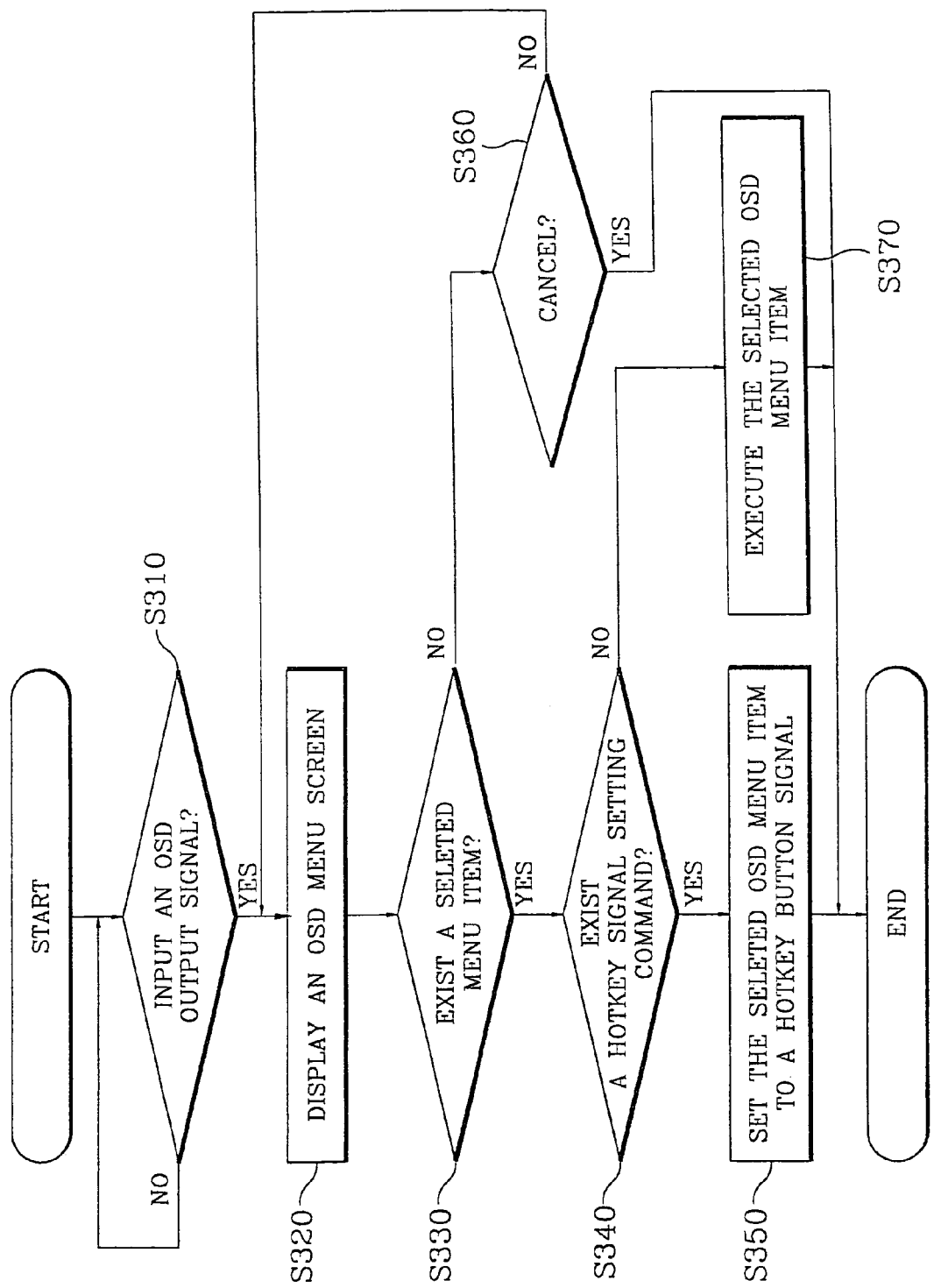
FIG. 3 is a flow chart for a method for re-setting hotkey button information in a memory according to the embodiment of the present invention.

First, the setting mode is described with reference to FIG. 3. If a user presses a button (not shown) for an item of an OSD menu for a video display apparatus, control unit 30 receives a signal from the pressed button and sends an OSD character display signal to OSD unit 40. This causes display of an OSD menu on a screen. OSD unit 40 receives the OSD character display signal and sends an OSD character signal to video processing unit 50 (step S310). The video processing unit adds the OSD character signal to a video signal to display an OSD menu on the screen (step S320). Control unit 30 then determines whether a user has selected a menu item from the OSD menu displayed on the screen (step S330). If a menu item was selected, control unit 30 determines whether hotkey button was selected (step S340). If a hotkey button was selected, the control unit changes hotkey button information stored in memory unit 20 to newly selected information on the OSD menu and stores the changed information (S350).

If no hotkey button was selected, control unit 30 reads from memory unit 20 and executes the information corresponding to the OSD menu item (S370) to control an entire function of the video display apparatus.

If in step S330, the selected OSD menu item from an OSD menu on the screen was found not to be included, control unit 30 checks if a cancel signal was inputted by a user. If a non-signal predetermined input time period lapses, the system determines whether a cancellation was made (S360).

If so, control unit 30 stops execution of the process. If not, a return to step S320 is executed.

Figure 4:
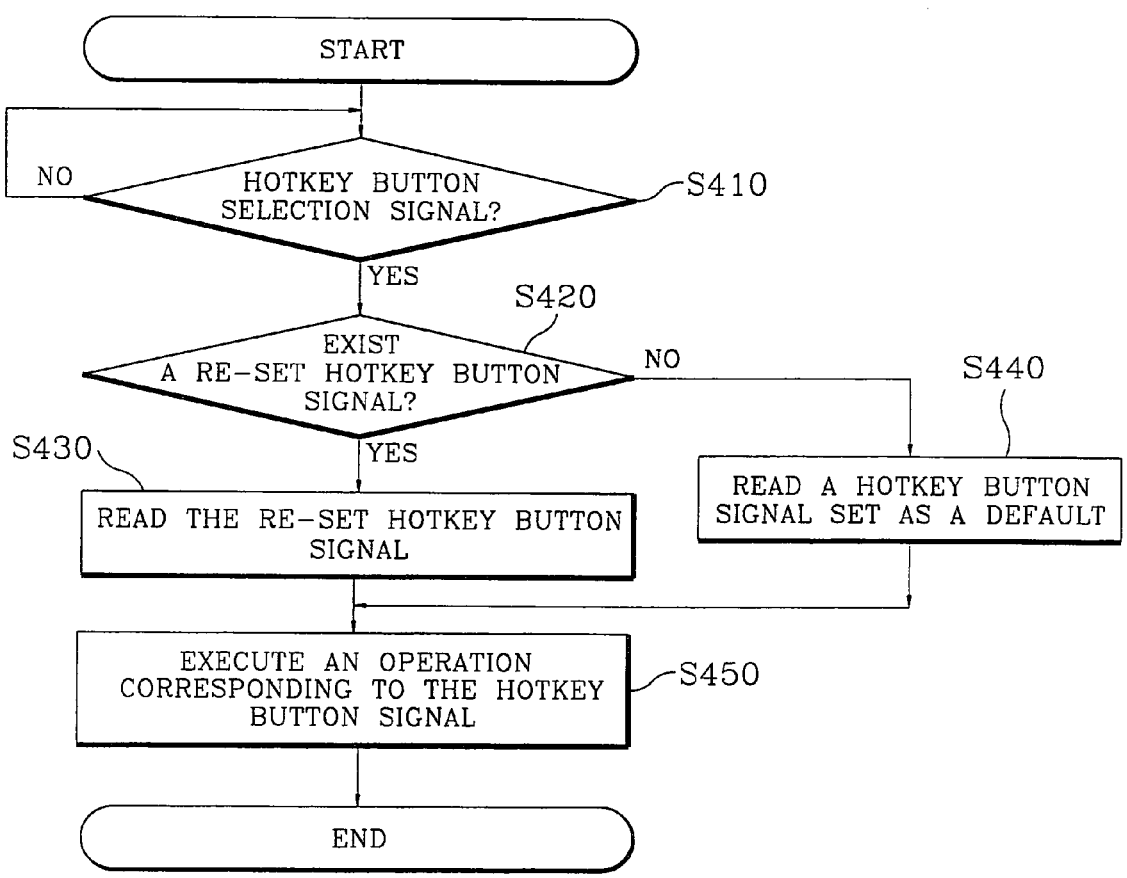
FIG. 4 is a flow chart for a processing method when a hotkey button is selected according to an embodiment of the present invention.

The processing mode of control unit 30 for a hotkey button is now described with reference to FIG. 4. First, the control unit determines whether a hotkey button was selected by a user (S410). If so, detection circuitry (e.g., computer program instructions executed in a microprocessor) in the control unit determines whether information on the hotkey button is set in memory unit 20 (S420).

If it is determined that information on the hotkey button exists, the detection circuitry ("detector") of control unit 30 reads the information on the hotkey button from memory unit 20 (S430). The control unit then executes its operation to control the entire system according to a signal corresponding to the information (S450). If it is determined, in step S420, that information on a re-set hotkey button does not exist in memory unit 20, the detector of control unit 30 reads hotkey button information which is set as a factory default (S440) and then executes its operation to control the entire system (S450).

If it is determined in step S420 that the hotkey button information re-set in memory unit 20 does not exist, the detector of control unit 30 of the video display apparatus reads the hotkey button information which is set as a factory default from the memory unit (S440), and executes its operation for the entire system in response to the hotkey button information (S450).

Figure 5A:
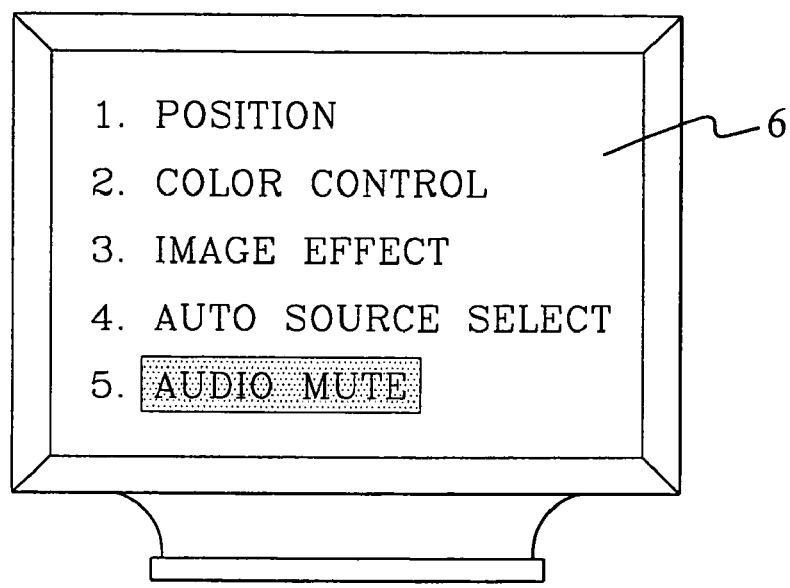
FIGS. 5A–5B depict a screen view showing an embodiment of the present invention.
Figure 5B:
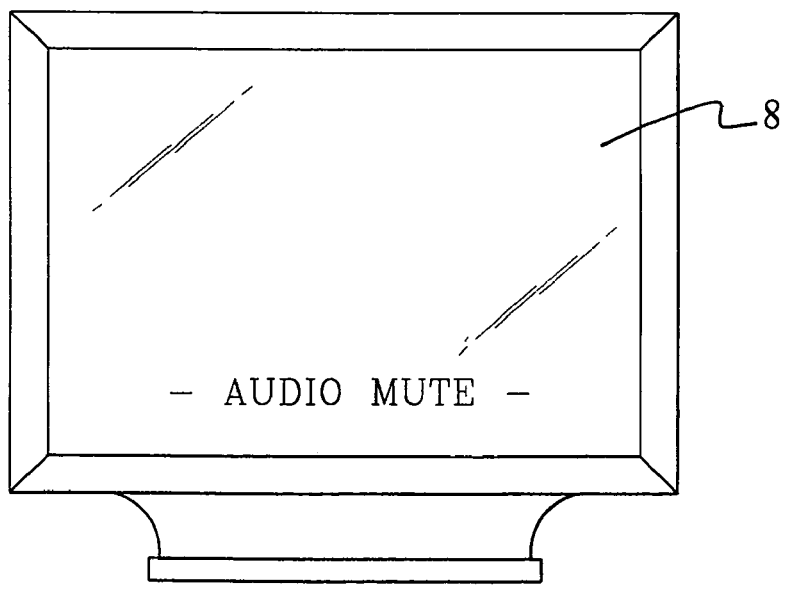

FIG. 5 is a screen view illustrating on an embodiment of the present invention. If a user selects a button for outputting an OSD menu screen using button unit 10, control unit 30 controls OSD unit 40 to display an OSD menu 6 on the screen as shown in FIG. 5A. If a hotkey button is then selected by a user, control unit 30 changes hotkey button information set in memory unit 20 to "AUDIO MUTE" information and stores the changed hotkey button information. Then, if a user selects the hotkey button, as shown in FIG. 5B, an "AUDIO MUTE" message on screen menu 8 is outputted and the sound output is muted.

Further, when OSD menu items are increased due to increasingly diverse functions of the video display apparatus, plural subscreens may be furnished. A desired OSD menu screen out of the plural subscreens may be controlled to be stored in memory unit 20 as hotkey button information.

Accordingly, if a user wishes to control frequently used functions, from OSD menu screens or menu items, the user sets hotkey button information to display a desired OSD menu screen immediately without other OSD menu screens. Thus, the video display apparatus of the invention permits the user to control the functions of the video display apparatus with more ease and convenience.

Although the preferred embodiment of the present invention has been described, it will be understood by those skilled in the art that the present invention should not be limited to the described preferred embodiment. Rather, various changes and modifications can be made within the spirit and scope of the present invention as defined by the following claims.

What is claimed is:

1. A video display control apparatus having hotkeys for a user to invoke and control a function of a video display apparatus, said function represented by a menu item from an on-screen display (OSD) menu, said video display control apparatus comprising:

a button unit comprising a hotkey button adapted for generating a key signal corresponding to a menu item of an OSD menu;

a memory unit coupled to the button unit, and adapted for storing information concerning OSD menu items;

an OSD unit for outputting an OSD character display signal to a video processing unit in response to said key signal, whereby actuation by a user of said hotkey button causes a screen display of one or more OSD characters; and a control unit for receiving said key signal from said button unit, for reading information concerning an OSD menu item stored in the memory unit when said key signal is received, and for thereupon sending a control signal to the video display apparatus to control a function thereof.

2. The video display control apparatus of claim 1, wherein the OSD menu displays at least one OSD menu item on the screen of the video display apparatus.

3. The video display control apparatus of claim 1, wherein said control unit further comprises a detector for determining whether present-time information corresponding to an OSD menu item selected at a present time is identical to past-time information corresponding to an OSD menu item and already stored in the memory unit and, when said present-time information is not identical to said past-time information, for enabling storage of said present-time information in the memory unit.

4. The video display control apparatus of claim 1, wherein said function of said video display apparatus is selected from the following group: audio mute, audio volume control, screen position, screen contrast, screen brightness, color, and tint.

5. A method of controlling a function of a video display apparatus, said method comprising the steps of:
  (1) when a user selects a menu item of an on-screen display (OSD) menu screen by causing generation of a hotkey button signal, determining whether a hotkey signal setting exists therefor;
  (2) when no hotkey signal setting exists therefor, executing a control function in response to the hotkey button signal; and
  (3) when a hotkey signal setting exists therefor, setting the user-selected menu item of the OSD menu screen responsively to the hotkey button signal.

6. The method of claim 5, wherein said method comprises the following further step after step (3): when a hotkey signal setting exists therefor, executing a control function in response to the hotkey button signal.

7. A method of controlling a function of a video display apparatus, said method comprising the steps of:
  (1) when a user selects a hotkey button, thereby generating a present-time hotkey button signal, determining whether a stored hotkey button signal identical to the present-time hotkey button signal is stored in a memory unit;
  (2) if a stored hotkey button signal is identical to the present-time hotkey button signal, executing a control function in response to the stored hotkey button signal; and
  (3) if no stored hotkey button signal is identical to the present-time hotkey button signal, executing a default control function.

8. A television (TV) system, comprising:
a TV display having a plurality of functions, said TV display being capable of displaying an on-screen display (OSD) menu having a plurality of menu items respectively corresponding to individual ones of said plurality of functions;

a memory unit adapted for storing information concerning OSD menu items;

means operable by a user for selecting one of said plurality of menu items;

means for generating a selection signal corresponding to said one of said plurality of menu items in response to selection thereof by the user;

control means for controlling said plurality of functions;

receiving means associated with the TV display for receiving said selection signal;

reading means coupled to said receiving means for fetching and reading, from the memory unit, information concerning an OSD menu item stored in the memory unit when said selection signal is received, said information corresponding to said selection signal; and sending means coupled to said reading means for sending a control signal to said control means, said control signal corresponding to said fetched and read information concerning the OSD menu item, whereby a function of the TV display is controlled in response to the control signal and in response to said information fetched and read from the memory unit concerning the OSD menu item.

9. The TV system of claim 8, further comprising:

a video processing unit;

means for outputting an OSD character display signal to the video processing unit in response to said selection signal; and actuation means associated with the video processing unit for receiving said OSD character display signal, and responsive thereto for causing a screen display of at least one OSD character, said at least one OSD character corresponding to said menu item of the OSD menu.

10. The TV system of claim 8, further comprising:

means for determining whether a selection signal is identical to a signal stored in the memory unit and associated with information concerning an OSD menu item;

means for executing a selected control function of the TV display in response to the selection signal when the selection signal is identical to a signal stored in the memory unit; and means for executing a default control function of the TV display in response to the selection signal when the selection signal is not identical to a signal stored in the memory unit.

* * * * *